United States Patent [19]

Shuma et al.

[11] Patent Number: 5,787,492
[45] Date of Patent: Jul. 28, 1998

[54] ADDRESS LIMIT CHECK APPARATUS WITH CONDITIONAL CARRY LOGIC

[75] Inventors: Stephen Gerard Shuma; Robert Francis Hayosh, both of South Burlington, Vt.

[73] Assignee: International Business Machines Corporation, Armonk, N.Y.

[21] Appl. No.: 629,697

[22] Filed: Apr. 9, 1996

[51] Int. Cl.$^6$ ................................................ G06F 12/00
[52] U.S. Cl. ...................... 711/201; 364/786.03
[58] Field of Search ........................ 711/201, 220; 364/768, 786.03

[56] References Cited

U.S. PATENT DOCUMENTS

| | | | |
|---|---|---|---|
| 3,999,052 | 12/1976 | Gooding et al. | 711/154 |
| 4,456,954 | 6/1984 | Bullions, III et al. | 711/207 |
| 4,695,950 | 9/1987 | Brandt et al. | 711/207 |
| 5,233,553 | 8/1993 | Shak et al. | 364/746 |
| 5,247,645 | 9/1993 | Mirza et al. | 711/5 |
| 5,274,834 | 12/1993 | Kardach et al. | 395/733 |
| 5,313,606 | 5/1994 | Luong et al. | 711/2 |
| 5,394,351 | 2/1995 | Widigen et al. | 364/786.01 |
| 5,418,736 | 5/1995 | Widigen et al. | 364/786.01 |
| 5,426,748 | 6/1995 | Brenza et al. | 711/203 |
| 5,440,710 | 8/1995 | Richter et al. | 711/207 |
| 5,564,030 | 10/1996 | Whitted et al. | 711/201 |
| 5,577,219 | 11/1996 | Timko et al. | 711/201 |
| 5,583,806 | 12/1996 | Widigen et al. | 384/786.03 |
| 5,590,351 | 12/1996 | Sowadsky et al. | 395/800.23 |
| 5,612,911 | 3/1997 | Timko | 364/768 |
| 5,625,582 | 4/1997 | Timko | 364/786.03 |

*Primary Examiner*—Eddie P. Chan
*Assistant Examiner*—Kevin Verbrugge
*Attorney, Agent, or Firm*—Whitham, Curtis & Whitham; Marc D. Schechter

[57] ABSTRACT

An effective address limit checker reduces the logic delay in the limit checking path. The address limit checker comprises an effective address (EA) adder and limit check logic. The EA adder includes a first carry save adder receiving a displacement, an index and a base address for calculating an effective address, and a second carry select adder receiving partial sum and carry outputs of said first adder for calculating an effective address carry out. The outputs of the EA adder are input to the limit checking logic together with an address limit value and an addressability mode field. The limit checking logic includes a third adder for calculating first partial limit information based on the first adder results and the limit value, and a fourth adder for calculating second partial limit information based on the first adder results and the limit value and conditioned carry out values of the third adder. The third and fourth adders are each composed of a carry save adder and a carry select adder. Conditional carry logic responsive to output values of the third adder controls the operation of the fourth adder based on the addressability mode field. Limit exceeded logic responsive to the carry out of the fourth adder and the second adder asserts a limit check condition.

10 Claims, 9 Drawing Sheets

FULL ADDER LOGIC EQUATION:

C = (A and B) or (B and C) or (A and C)
S = A xor B xor C

NOTE:
2 stages of delay
from input to output

ADDRESS LIMIT CHECK APPARATUS WITH CONDITIONAL CARRY LOGIC

DESCRIPTION

BACKGROUND OF THE INVENTION

1. Field of the Invention

The present invention generally relates to microprocessor architectures and, more particularly, to an effective address limit checker used to check a calculated effective address against an address limit value in a microprocessor architecture that supports different modes of operation.

2. Background Description

The Intel Corporation, Santa Clara, Calif., introduced the 16-bit microprocessor designated as the 8086 microprocessor from which a family of microprocessors evolved. A variant of the 8086 microprocessor, the 8088 microprocessor, was used in first International Business Machines (IBM) Personal Computer (PC). The 8086/8088 microprocessors had 20 address lines permitting the processor access to up to 1 megabyte (MB) of memory. The family of microprocessors that have evolved included the 80286 16-bit microprocessor which was used in the IBM AT (Advanced Technology) PC. The 80286 microprocessor had a 24-bit address and operated in two modes, a "real mode", which emulated the architecture of the 8086 and 8088 microprocessors, and a "protected mode", which provided enlarged memory addressing and multi-tasking support. These enhancements enabled the processor to access up to 16 MB of memory. The 80286 microprocessor was succeeded in turn by the 80386 microprocessor which was backward compatible with the 80286 and 8086 microprocessors but introduced new features, including enhanced memory addressing capabilities and introduced a new operating mode, virtual real mode operation which supported multiple 8086 sessions in a true multi-tasking environment. The 80386 microprocessor utilizes a memory management system organized to allow both segmentation addressing and demand paged addressing of memory. There are two variants of the 80386 microprocessor; the SX version which has 24 address lines and the DX version with 32 address lines. Thus, the DX version can address up to 4 gigabytes (GB) of memory. The 80486 microprocessor, although similar to the 80386 microprocessor in many ways, introduced a higher level of integration, eliminating many support chips and incorporating an on-chip math co-processor. The 80486 microprocessor also comes in two versions, the SX and DX versions, but this time the SX version is equivalent to the DX with the math coprocessor disabled. Both versions have 32 address lines. An even higher level of integration was introduced with Intel's Pentium® microprocessor with a superscalar architecture, and it like the 80486 microprocessor builds upon the basic 80386 architecture. This family of microprocessors has come to be known as the X86 family of microprocessors meaning in particular the 80386 32-bit microprocessor, its successors and clones produced by a variety of manufacturers.

Although the current generation of X86 microprocessors are 32-bit microprocessors having 32 address lines (except the 80386SX microprocessor which has only 24 address lines), the installed software base is still predominately written for 16-bit addresses compatible with the old 8086/8088 microprocessors. Newer software applications are being developed to take advantage of 32-bit addresses afforded by the current generation of X86 microprocessors. However, while the large base of 16-bit address software continues in use, it is necessary to be able to generate both 16-bit and 32-bit addresses. To generate addresses that are compatible with both the current generation of X86 compatible 32-bit microprocessors and older 16-bit X86 compatible microprocessors, a flexible address generation scheme must be developed.

Two components must be generated for an X86 address, the effective address and the linear address. The effective address is generated from three terms, the base, the displacement and the index; that is, Effective Address→Base+Displacement+Index. The linear address is generated from the effective address and from a segment base term; that is, Linear Address→Effective Address+Segment Base. The components of the Effective Address can be either positive or negative. Also, architecture compatibility may require different modes of operation such as in X86 16-bit architecture and 32-bit architecture, where instructions may execute as if they were in a 16-bit machine when they are actually in a 32-bit machine.

The effective address must be checked against an address limit value. The address limit assures that the calculated EA is within the assigned range. It is possible that an address is generated that is within the limit but the operand extends beyond the limit. Therefore, the word length (i.e., number of bytes) of the operand must also be considered. For example, {(EA)+(WL)−limit} if positive, limit exceeded. This combination of architected requirements and others results in many levels of circuits in actual implementation.

The address limit checking can take two levels of carry select/ripple adders (one for EA calculation, one for limit checking) as well as additional logic levels. The many levels of logic become a cycle time limiter which is not acceptable in an aggressive microprocessor design. A solution is needed that can perform the limit checking in fewer stages of logic (e.g., only one carry select adder) and does not require excessive loading (i.e., capacitance).

While the invention is described in terms of the X86 example, one skilled in the art would find implementations required by other architectures using a different number of EA components are also taught by this invention. In fact, the number of values needed to calculate an EA is independent of the invention.

SUMMARY OF THE INVENTION

It is therefore an object of the present invention to provide a novel effective address limit checker that reduces the logic delay in the limit checking path.

According to the invention, there is provided an apparatus for performing an address limit check comprising an effective address (EA) adder and limit check logic. The EA adder includes a first carry save adder receiving a displacement, an index and a base address for calculating an effective address, and a second carry select adder receiving partial sum and carry outputs of said first adder for calculating an effective address and carry out. The outputs of the EA first carry save adder are input to the limit checking logic together with an address limit value and an addressability mode field. The limit checking logic includes a third adder for calculating first partial limit information (low order bits) based on the first adder results and the limit value, and a fourth adder for calculating second partial limit information (high order bits) based on the first adder results and the limit value and conditioned carry out values of the third adder. The third and fourth adders are each composed of a carry save adder and a carry select adder. Conditional carry logic responsive to the carry out of the third adder and low order carry out of the second adder controls the operation of the fourth adder based on the addressability mode field. Limit exceeded logic responsive to the carry out of the fourth adder and the high order carry out of the second adder asserts a limit check condition.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
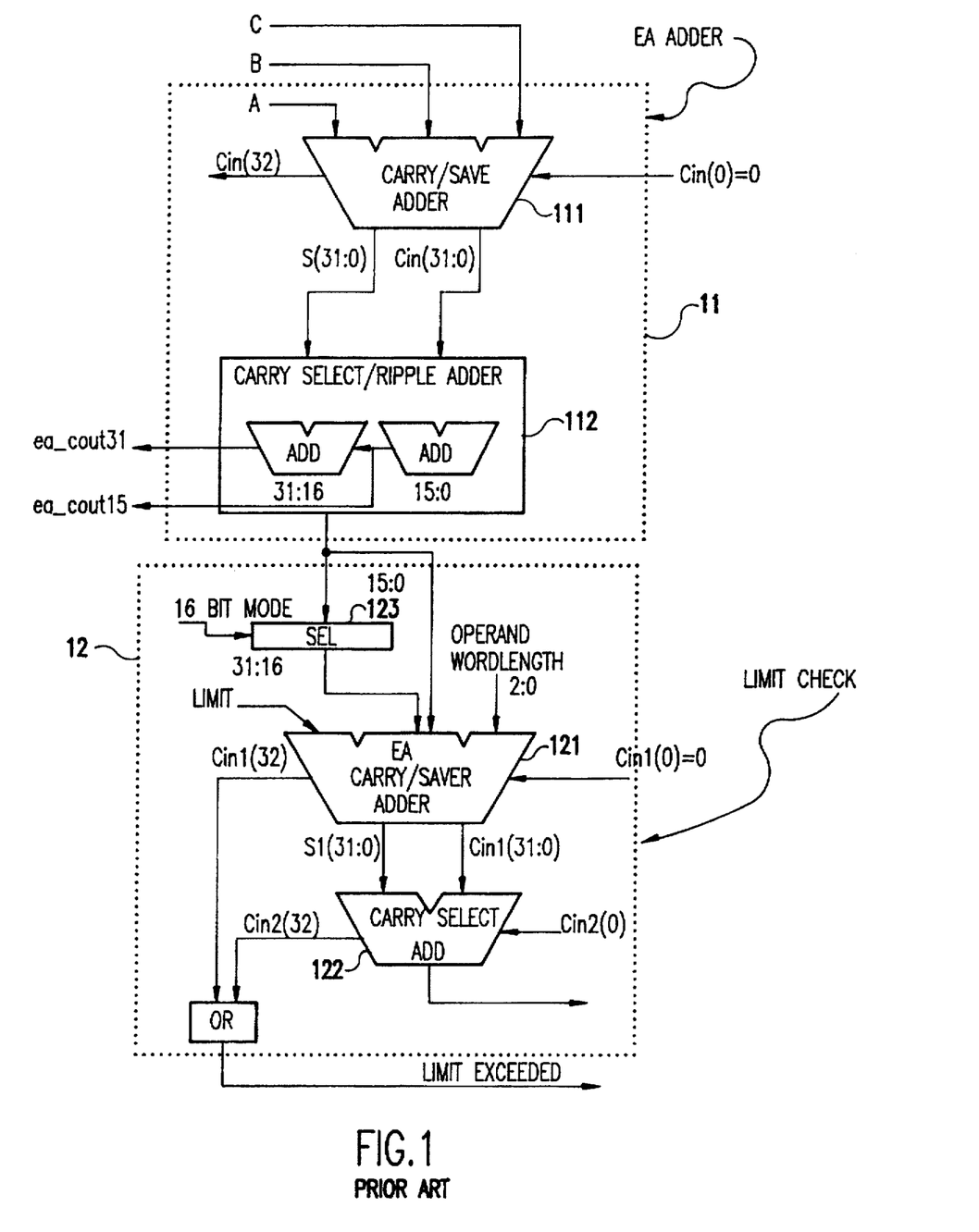
FIG. 1 is a block diagram showing a prior art circuit for the effective address limit checking function.

Referring now to the drawings, and more particularly to FIG. 1, there is shown a prior art effective address limit checker circuit which comprises two components; the EA adder 11 and the limit check logic 12. The EA adder uses a carry save adder 111 followed by a carry select adder 112 in order to generate the EA. The EA from the EA adder 11 then passes through another carry save adder 121 and a second carry select adder 122 in the limit check logic 12 in order to perform the limit check. The low order sixteen bits (15:0) of the EA adder are supplied directly to the carry save adder 121 while the high order sixteen bits (31:16) of the EA adder are passed through the mode select circuit 123. The output of the mode select circuit 123 is combined with low order sixteen bits into one 32-bit bus, which constitutes one of three input busses to the carry save adder 121.

In FIG. 1, the sum output of the limit check carry select adder 122 is used within the processor, but it is not the subject of this invention. It is necessary that the correct value is propagated on this bus, and the disclosed invention ensures this.

Figure 2:
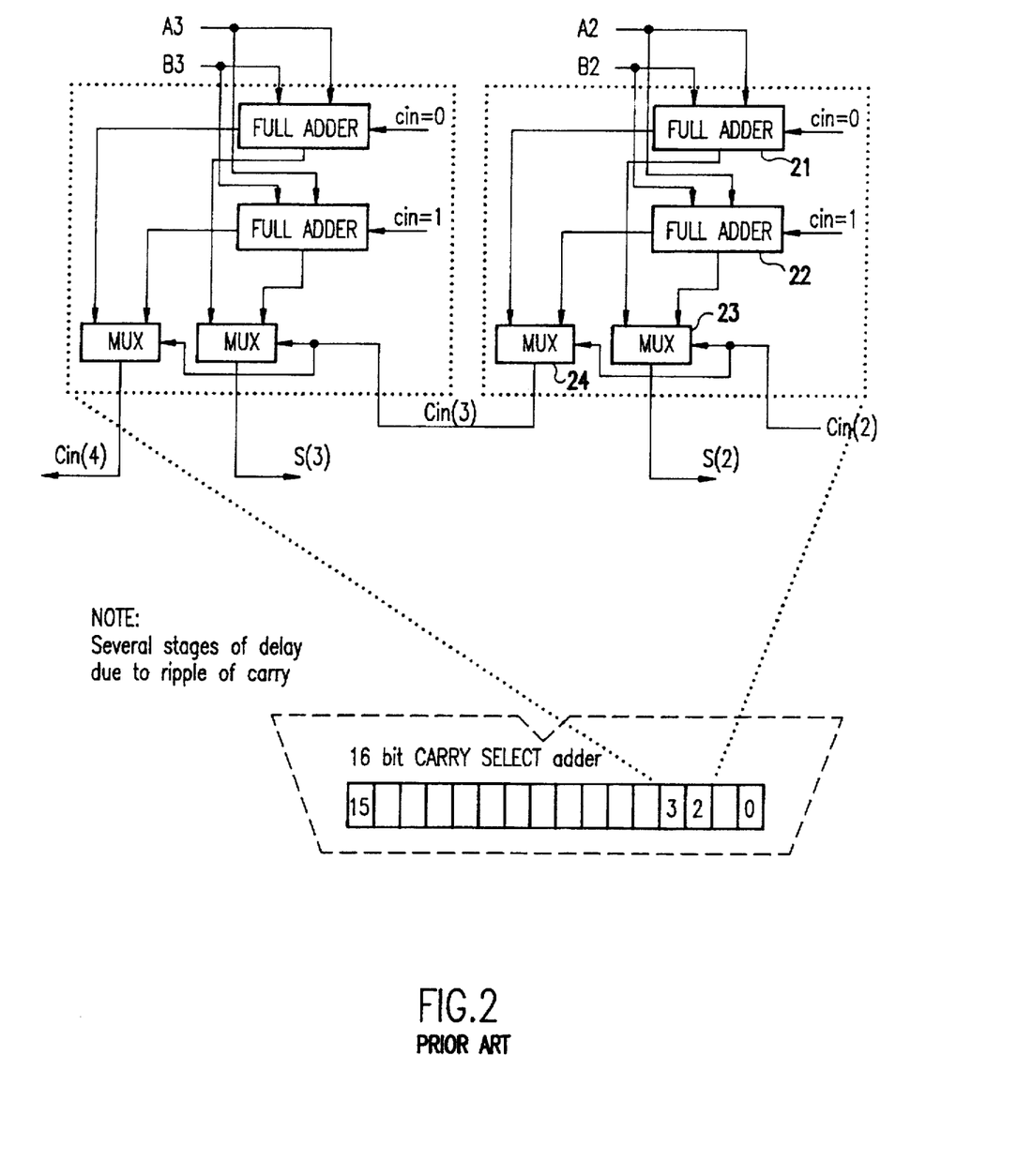
FIG. 2 is a block diagram showing the basic logic of a carry select adder.

A carry select adder works on the principle that two additions are performed in parallel, one assuming the carry-in is zero and the other assuming the carry-in is one. When the carry-in is finally known, the correct sum is selected. An example of a carry select adder is shown in FIG. 2. Here, two stages of the adder are shown, but it will be understood that all stages (sixteen in this example) are the same construction. In each stage, there are two full adders 21 and 22, each receiving corresponding operand bits (e.g., A2, B2), with the carry-in wired to zero for full adder 21 and the carry-in wired to one for full adder 22. The sum outputs from full adders 21 and 22 are supplied to multiplexer (MUX) 23, the their carry outputs are supplied to multiplexer 24. The carry-in for that stage, here denoted Cin(2), controls the multiplexers 23 and 24 to select the correct sum and carry outputs for the stage. Note that there are several stages of delay due to "ripple" of the carry in the carry select adder.

Figure 3:
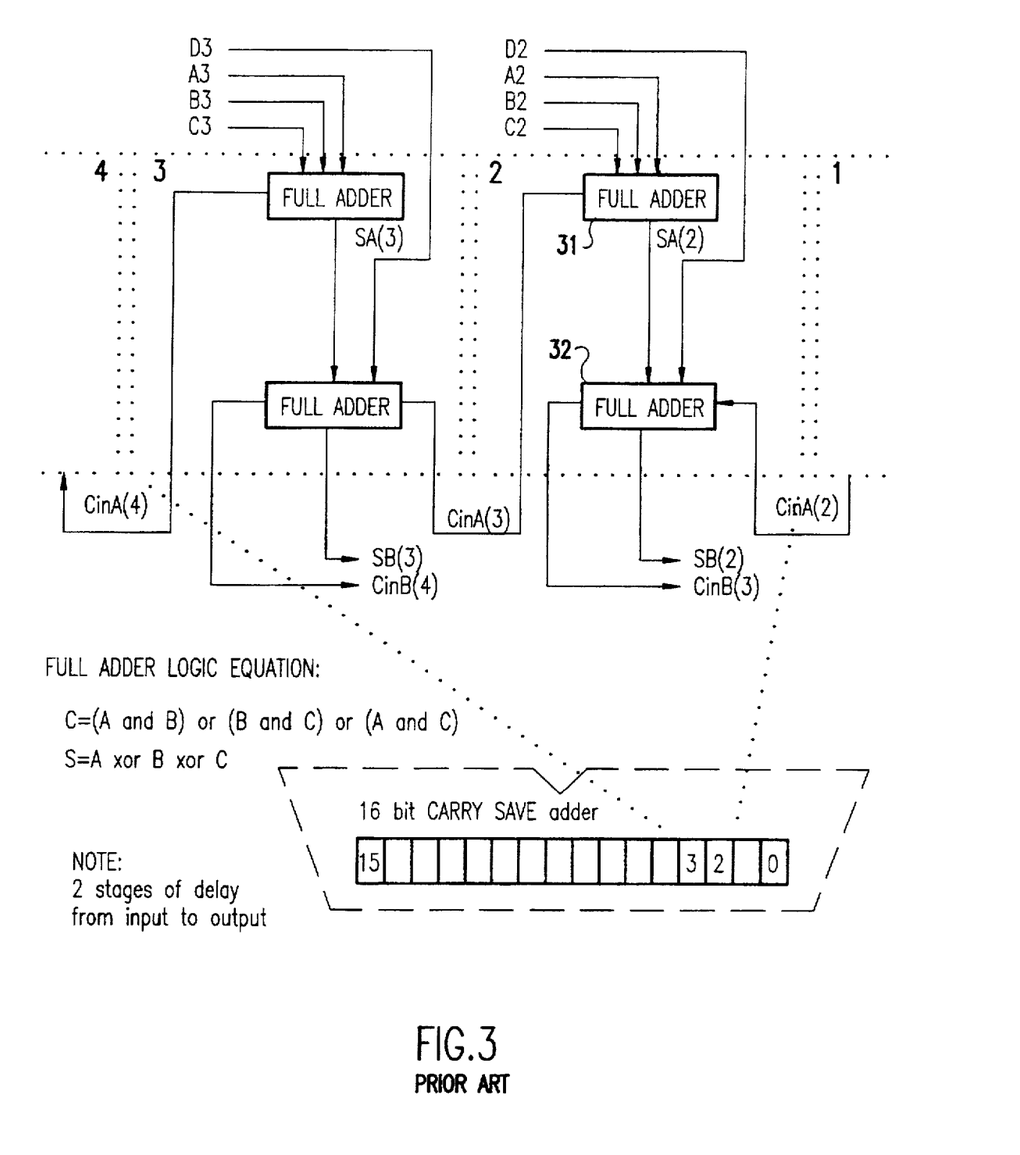
FIG. 3 is a block diagram showing the basic logic of a carry save adder.

A carry save adder is simply a plurality of independent full adders. An example is shown in FIG. 3. Two stages of the adder are shown, but again it will be understood that all stages (sixteen in this example) are the same construction. In each stage, there are two full adders 31 and 32, with full adder 31 receiving corresponding operand bits A2, B2 and C2 and generating a first sum output SA(2) and a first carry output, which becomes the carry-in CinA(3) for the next stage. Full adder 32 receives the sum output SA(2) from full adder 31, operand bit D2 and the carry-in input CinA(2) and generates a second sum output SB(2) and a second carry output, which becomes the carry-in CinB(3) for the next stage. Note that a carry save adder introduces only a couple of levels of logic delay, while a carry select adder introduces several levels of delay due to the "ripple" of the carry bits. In an aggressive one cycle implementation, the delay through two carry select adders cannot be tolerated.

A carry save adder is used to "collapse" multiple input buses (more than two) down to two buses, a partial sum bus and a partial carry bus. A carry select adder can then be used on the two output buses to generate a final sum bus and carry out bit.

Figure 4:
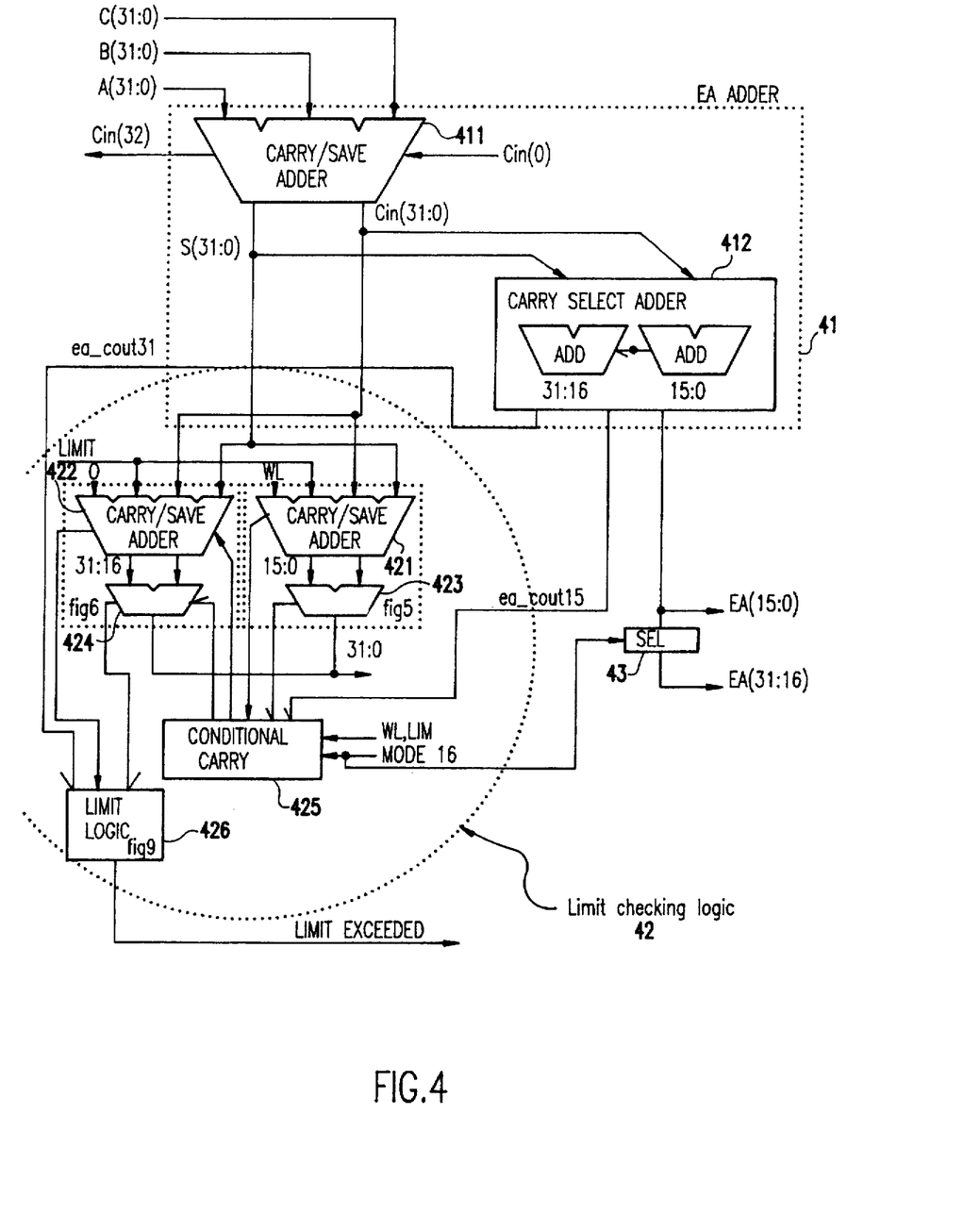
FIG. 4 is a block diagram showing the effective address checking circuit according to the present invention.

FIG. 4 shows the effective address limit checker circuit according to the present invention. This circuit also comprises two components; the EA adder 41 and the limit checking logic 42. The EA adder 41 includes a carry save adder 411 and a carry select adder 412, as in the prior art shown in FIG. 1; however, the outputs of the carry save adder 411, S(31:0) and Cin(31:0) are propagated directly to the limit checking logic 42. The limit checking logic includes carry save adders 421 and 422 for the low order sixteen bits (15:0) and the high order sixteen bits (31:16), respectively. The sum and carry outputs of the carry save adders 421 and 422 are input to respective carry select adders 423 and 424. These carry save/carry select adder combinations are respectively shown in more detail in FIGS. 5 and 6. The carry output of the carry save adder 421 and carry select adder 423 go to conditional carry logic 425, shown in more detail in FIG. 8, while the carry outputs of the carry save adder 422 and carry select adder 424 go to address limit exceeded detection logic 426, shown in more detail in FIG. 9. The conditional carry logic 425 also receives the WL, the lower order limit, and the mode sixteen signal, this latter signal going to the selector 43 which receives the sum output of the carry select adder 412.

Note that the new limit check is accomplished with two carry save adders and only one carry select adder. The first carry save adder 411 is the same as the first carry save adder 111 in the prior art implementation shown in FIG. 1. In fact, the outputs of this adder are still used to generate the EA with the carry select adder 412, the same as the carry select adder 112 in the prior art implementation. The new circuitry uses the outputs of this first carry save adder (S and Cin) as inputs to the second carry save adder. This carry save adder (421, 422) also adjusts for the operand word length (WL) and subtracts the LIMIT value. Use of S and Cin as inputs eliminates the carry select adder delay of the EA calculation stage of the prior art implementation.

The circuit of FIG. 4 thus makes the following calculation:

{(S+Cin)+(WL)–limit} if positive, limit exceeded, versus the prior art calculation:

{(EA)+(WL)–limit} if positive, limit exceeded.

In general, it is best to reduce the number of input operands to an adder function to two as quickly as possible. Carry save adders are very effective at accomplishing this quickly. Once the operands have been reduced to two, one carry select adder stage can be used to generate the final sum and carry output signals.

The most complex part of the new circuit is the conditional carry predict logic which is used to adjust the three carries in the limit check adder (two for the four-way carry save adder, one for the two-way carry select adder) into the upper sixteen bits of the carry save and carry select adders (fourth adder) from the lower sixteen bits (third adder). This adjustment is based on whether the limit is being checked for a 16-bit or 32-bit address. These adjusted carries are propagated through the high order 16-bit adders and used to determine if the limit was exceeded.

Note that in the prior art circuitry, any carry-outs from the EA calculation (out of bit 15 for 16-bit mode or bit 31 for 32-bit mode) were "thrown out" before the limit checking was performed. The prior art limit checking adder used the output from the EA carry select adder, or second adder, to perform the limit check. Any carry-outs from the EA calculation were therefore not seen by the limit checking circuitry. In the present invention, these carry-outs from the EA calculation must still be ignored. This proves difficult, however, since the inputs to the EA carry select adder (second adder), or outputs of the EA carry save adder (first adder), are now used directly as inputs to the limit checking adders (third and fourth adders). So the EA carry-outs are effectively "buried" in the limit checking adder inputs.

Since the EA is still generated in the present invention in a separate carry select adder (second adder), the carry-outs in question are still available for inspection. However, in order to preserve the cycle time advantage of the new implementation, these carry-outs can only be used at the carry select adder stage of the limit checking hardware (adders 423 and 424). This carry select adder and the EA carry select adder are effectively equivalent with respect to delay on the inputs. Since these adders execute in parallel, the carry-out from the low order sixteen bits of the EA carry select adder can be used to predict the carry-in to the high order sixteen bits of the limit check carry select adder without negatively affecting the overall logic delay. The conditional carry predict logic of this invention takes this into account. Similarly, the carry-out from the high order bits of the EA carry select adder can be used in conjunction with the carry-out from the high order limit checking adder in the limit exceeded detection logic.

A first carry save adder 411 adds A+B+C (the Base value (A), the Index value (B) and the Displacement value (C)) and reduces the number of EA components to two. This first adder generates bit sums S(31:0) and bit carry-ins Cin(31:0). We use the convention of bit 0 as the least significant bit (LSB). The Displacement value in the X86 implementation is pre-shifted to conform to the scaling factor requirement; hence, three instead of four EA components.

The S and Cin components of EA feed a four-way carry save adder, separated into two 16-bit adders 421 and 422. This adder pair subtracts the 32-bit limit value from the sum of EA plus the word length (WL). Each 16-bit carry save adder 421 and 422 feeds a 16-bit carry select adder 423 and 424, respectively. The sum outputs of the carry select adders are used in the processor, but are not the subject of this invention. The carry-outs of the carry select and carry save adders are used in the limit checking and conditional carry logic, which is the subject of this invention.

Figure 5:
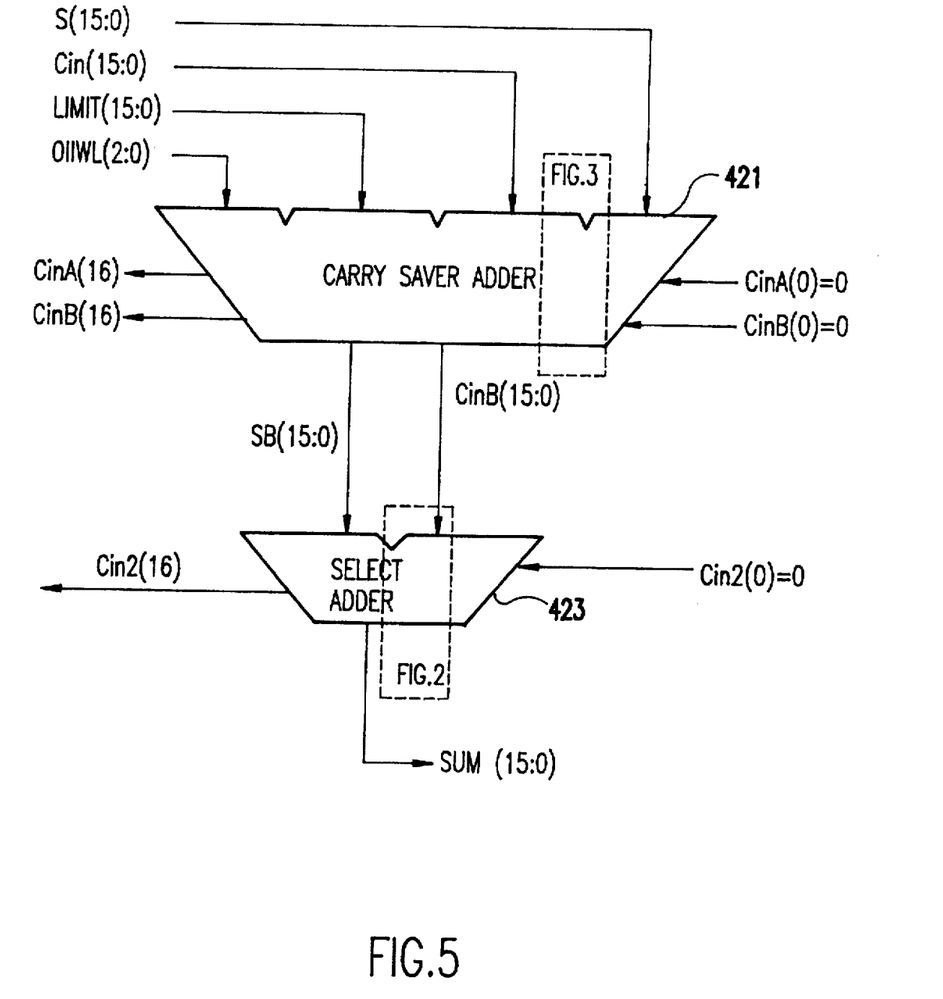
FIG. 5 is a block diagram of the low order carry save/carry select adders (third adder) of the limit checking logic of FIG. 4.

FIG. 5 shows the low order bits of the limit check carry save and carry select adders 421 and 423. The carry save adder 421, which may be of the type shown in FIG. 3, receives the low order bits S(15:0) and Cin(15:0) from carry save adder 411. In addition, the carry save adder 421 receives the LIMIT (15:0) value and three bits (2:0) of word length (WL). The carry-in signals CinA(0) and CinB(0) for the first stage of the carry save adder 421 are wired to zero, and the carry out signals CinA(16) and CinB(16) are output from the last stage of the carry save adder 421 to the conditional carry logic 425 shown in FIG. 4. The carry select adder 423 may be like that of FIG. 2 and receives the sixteen bit sum SB(15:0) and sixteen bit carry CinB(15:0) from carry save adder 421. The carry-in signal Cin2(0) to the first stage of carry select adder 423 is wired to zero. The carry select adder 423 generates a sixteen bit sum SUM(15:0) and a one bit carry Cin2(16), which is used in conditional carry logic 425 of FIG. 4.

Figure 6:
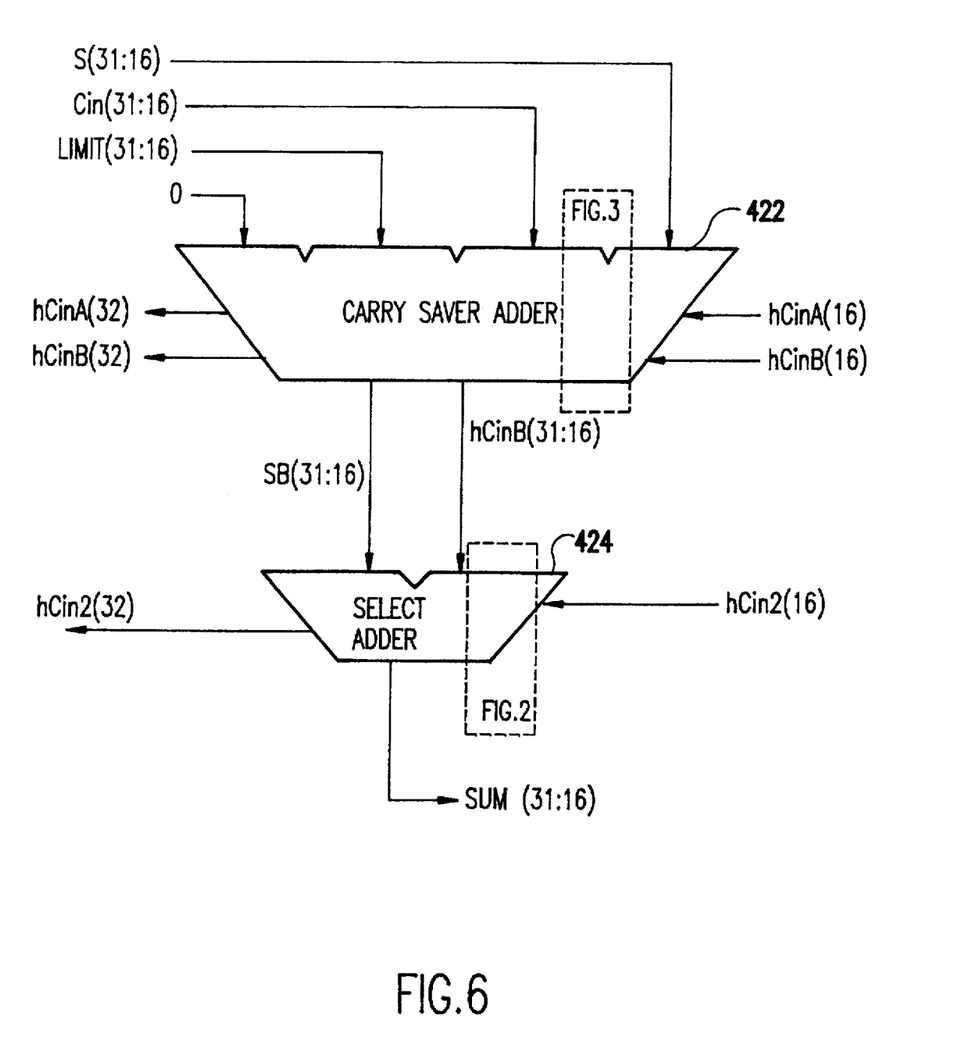
FIG. 6 is a block diagram of the high order carry save/carry select adders (fourth adder) of the limit checking logic of FIG. 4.

FIG. 6 shows the high order bits of the limit check carry save and carry select adders 422 and 424. The carry save adder 422 and carry select adder 424 for the high order sixteen bits are similar to that just described for the low order 16-bit adders 421 and 423. Here, the carry save adder 422 receives the high order 16-bit sum S(31:16) and carry C(31:16) from carry save adder 411 and the high order bits LIMIT (31:16), but the fourth input is wired to zero. The carry-in signals hCinA(16) and hCinB(16) to the first stage of carry save adder 422 are supplied by the conditional carry logic 425, shown in FIG. 4, and the carry output signals hCinA(32) and hCinB(32) are supplied to address limit exceeded detection logic 426, also shown in FIG. 4. The carry select adder 424 receives the sum SB(31:16) and carry hCinB(31:16) from carry save adder 422. The carry-in hCin2(16) for the first stage of the carry select adder 424 is supplied by the conditional carry logic 425 shown in FIG. 4, and the carry out signal hCin2(32) is supplied to the limit exceeded logic 426, also shown in FIG. 4.

The limit check adders are designed as pairs of 16-bit adders since the invention solves the problem of limit checking for architectures supporting sub-set architectures. X86 supports 16-bit and 32-bit EAs, for instance. However, the invention is not limited to this boundary nor to specific EA architectures, as will be readily recognized by one skilled in the art.

Conditional carry logic 425 at the 16-bit boundary of carry save adder 421, 422 and the carry select adder 423, 424 adjusts the carries into the high order 16-bit sections of the adders based on whether the instruction is 16-bit or 32-bit and EA low order carry out. These adders and control logic represent the best mode of the invention.

Figure 7:
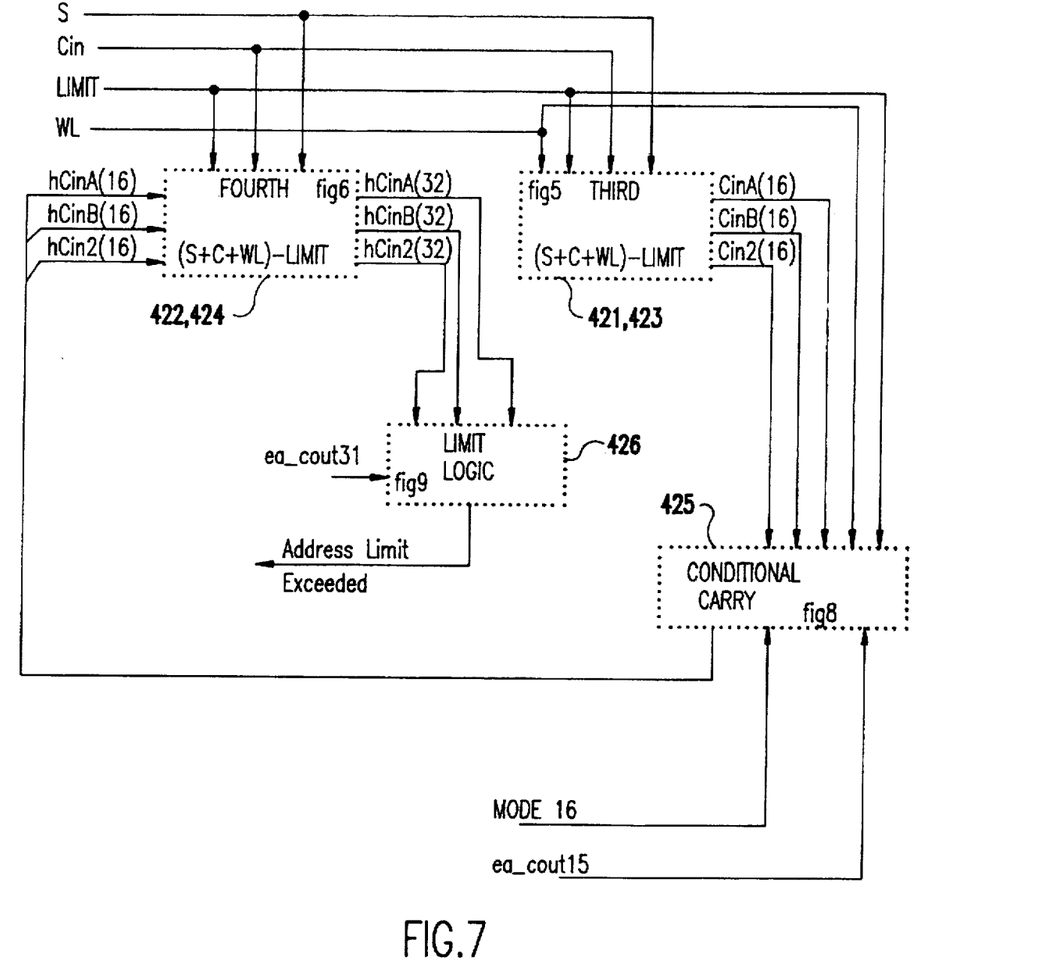
FIG. 7 is a high level block diagram showing a relation of the conditional carry logic and address limit exceeded detection logic to the carry save/carry select adders of the limit checking logic.
Figure 8:
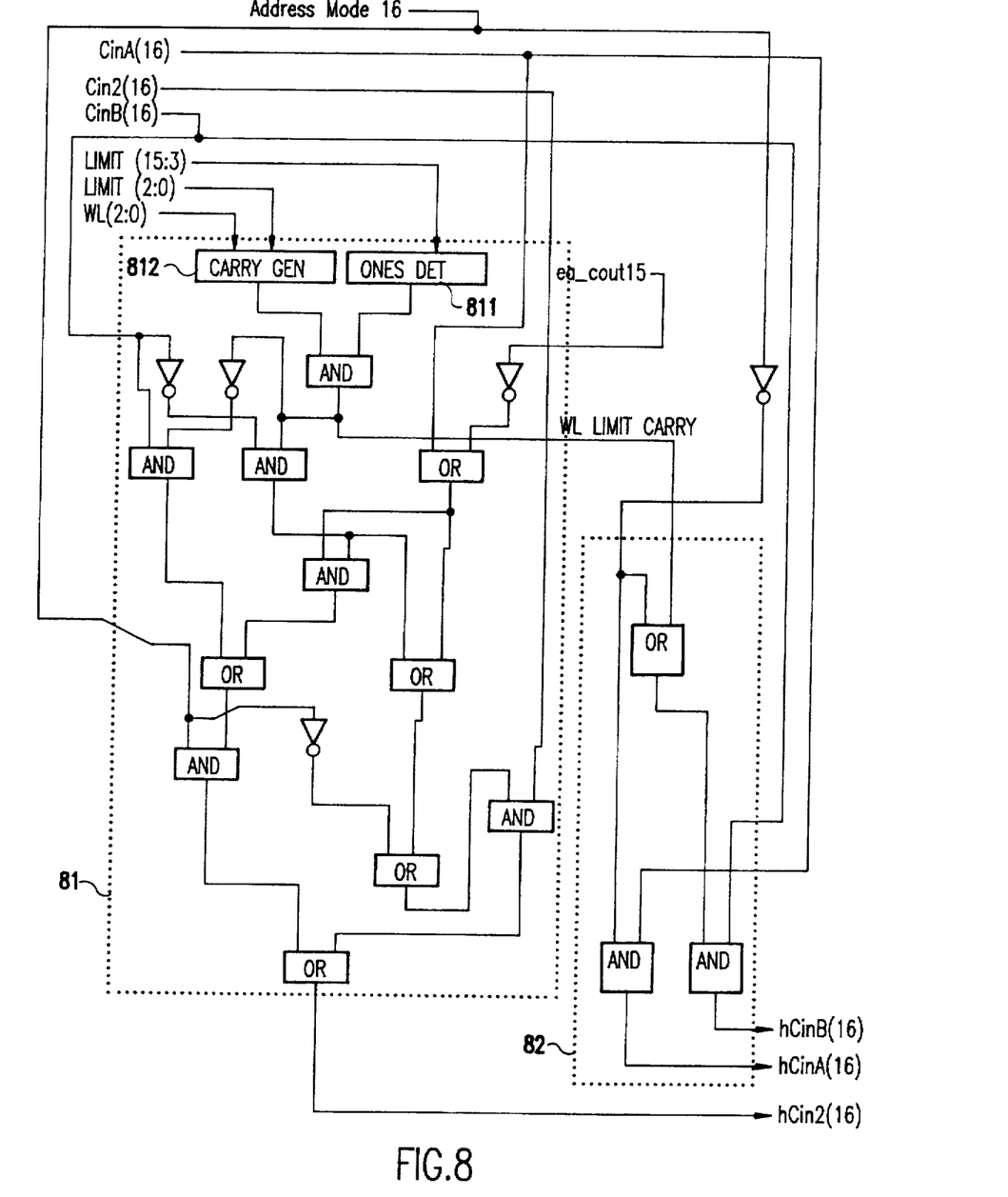
FIG. 8 is a block diagram of the conditional carry logic used in a preferred embodiment of the invention.
Figure 9:
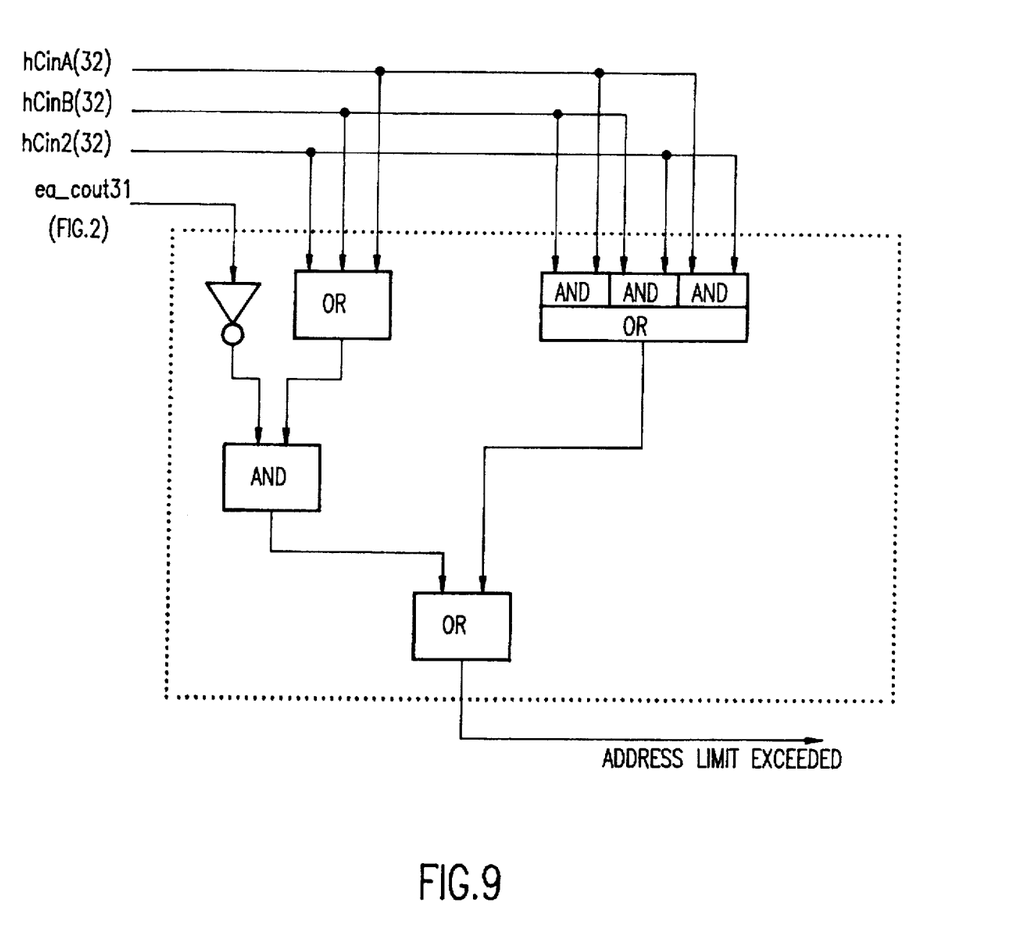
FIG. 9 is a block diagram of the address limit exceeded detection logic used in a preferred embodiment of the invention.

FIG. 7 shows a high level depiction of the conditional carry logic 425, shown in more detail in FIG. 8, and the address limit exceeded detection logic 426, shown in more detail in FIG. 9. The three carry-outs from the low order limit checking adder, or third adder (two from carry save adder 421 and one from carry select adder 423), are used in conjunction with the lower sixteen bits of the limit, the word length, the 16-bit mode indicator, and the 16-bit boundary carry-out from the EA carry select adder 412 (ea_cout15) to generate the three carry-ins to the high order limit checking adder, or fourth adder. The details of this conditioning logic are shown in FIG. 8 and are described in the "Limit Checking Adder" and Truth Table sections below.

The three carry-outs from the high order limit checking adder, or fourth adder (two from carry save adder 422 and one from carry select adder 424), are used in conjunction with the 32-bit boundary carry out from the EA carry select adder 412 (ea_cout31) to perform the limit check. The details of the limit checking logic are shown in FIG. 9.

Referring next of FIG. 8, the conditional carry logic 425 comprises two components, logic block 81 and logic block 82. Logic block 81 receives as inputs LIMIT (15:0) and WL (2:0). The LIMIT input is divided into two groups (15:3), which is input to ones detector 811, and (2:0) which is input to carry generator 812 with the WL input. Logic block 81 also receives as an inputs Cin2(16) and ea_cout15, and both logic blocks 81 and 82 receive as inputs CinA(16), CinB(16) and Address Mode 16. Logic block 81 generates an WL LIMIT CARRY output which is input to logic block 82. The logic of FIG. 8 is best understood by perusing the information in the "Limit Checking Adder" and Truth Table sections in the following description.

In FIG. 9, the address limit exceeded detection logic 426 looks at the three carry-outs from the three stages of the high order limit check adders (hCinA(32), hCinB(32), hCin2 (32)) as well as the carry-out from the high order EA carry select adder (ea_cout31). If ea_cout31 is on, then two of the three carry-outs from the limit check adders must be on in order to prove the limit exceeded. The rationale here is that if there was a carry-out from the EA calculation, it will appear on one of the limit check adder carry-outs and it should be ignored. If ea_cout31 is off, then only one of the three carry-outs from the limit check adders must be on in order to prove the limit exceeded.

A carry out from the high order limit check adder at any of the three positions (two from carry save adder 422 and one from carry select adder 424) could indicate that the limit was exceeded. However, if ea_cout31 is on, one of these three carry-outs must be ignored because the carry-out from the EA calculation was "thrown away" in the prior art implementation and must also be thrown out in the disclosed implementation (as discussed earlier). Also, if ea_cout31 is on, then at least one of the three carry-outs from the high order limit check adder (fourth adder) must be on. The logic shown in FIG. 9 uses ea_cout31 to determine if one or two of the carry-outs from the fourth adder need to be on to prove the limit was exceeded.

In the broad teaching of this invention, the conditional carry bits are manipulated according to the architecture of the implementation. The X86 limit checking is shown as but one example, and one skilled in the art can easily use the concepts of the invention to perform address checking of other multi-mode address architectures.

The conditional carry logic is created by analyzing the requirement of the architecture. It must ignore carries generated in EA calculation in both 16 and 32-bit mode which were "thrown out" in the first carry select stage of the prior art implementation.

For the purpose of the following discussion, it will be helpful to think of the limit check carry save and carry select adders (421, 423 and 422, 424) as one three-stage adder. Each bit of the limit check four-way carry save adder is made up of two "full adders" (see FIG. 3). The first row of full adders will be called "Stage One", and the second will be called "Stage Two". The limit check carry select adder will be called "Stage Three".

LIMIT CHECKING ADDER

Arrange the inputs to the adder as follows:

The first stage inputs are S, Cin (both from EA carry save adder 411), and WL.

The second stage inputs are SA, CinA (both from stage 1), and LIMIT.

The third stage inputs are SB and CinB (both from stage 2).

Note: In 16-bit mode, at most two of the three carries which cross the 16-bit boundary can be "real". The rationale is that if all three of the carries were on, one of them would have to be from the addition of S and Cin to create EA. For 16-bit mode, we want to ignore this carry. To explain further, we can logically think of the adder as:

Sum1=LIMIT+WL (actually the opposite of LIMIT for subtraction)

Sum2=EA (S+Cin)

Sum3=Sum1+Sum2

One carry can be generated from each of these logical summations. In 32-bit mode, all three carries should be passed across the 16-bit boundary as generated.

Stage One:

A carry out of stage one can only be caused by S(15)= Cin(15)=1, which are the EA components.

We know WL(15)=0 (WL can be 1, 2, 4, or 8 bytes, so only two bits are needed to represent it. This is common for many architectures.

See FIG. 3 for the functioning of a full adder stage.

Any carries out of stage one should be killed in 16-bit mode.

hCinA(16)=CinA(16) AND NOT (mode16)

Any real carries will come from stage two and/or stage three.

Next, the low order sixteen bits of the limit (actually two's complement of Limit) are added to WL to determine if there would be a carry out from the first logical summation of the adder (wl_limit_carry). Physically, this can be done easily and quickly since WL is only three bits. A ones detect is done on bits (15:3) of the limit and a carry generation is done on bits (2:0) of the limit and WL. If both are one, we know a carry would have been generated from logical summation one.

Stage Two:

If wl_limit_carry=1, we have one or two real carries.

If wl_limit_carry=0, we have zero or one real carries.

Only keep the carry from stage 2 in 16-bit mode if wl_limit_carry=1.

hCinB(16)=CinB(16) AND (NOT(mode16) OR wl_limit_carry).

Stage Three:

The carry prediction for stage 3 (hCin2(16)) is more complex in that it must take into account the carries generated in the first two stages, the carries propagated in the first two stages, and the carry from the EA carry select adder. As discussed earlier, this carry-out could not be used in the generation of the carry-ins to the high order stage 1 and 2 adders due to cycle time limitations. The truth table below describes the operation of all of the components used in the prediction of hCin2(16). The cases with dashes in the right-hand columns are logically and physically impossible cases, so they are ignored.

16-BIT CARRY TRUTH TABLE

```
 ┌─ WL Limit Carry ─────────────────────── A
 │ ┌─ CinA (16) ────────────────────────── B
 │ │ ┌─ CinB (16) ───────────────────────── C
 │ │ │ ┌─ Cin2 (16) ──────────────────────── D
 │ │ │ │ ┌─ ea_cout15 ─────────────────────── E
 │ │ │ │ │   ┌─ hCinB (16) ─────────────────── X
 │ │ │ │ │   │ ┌─ hCin2 (16) ───────────────── Y
 │ │ │ │ │   │ │ ┌─ No. Real Carries ── Z
```

| A | B | C | D | E |   | X | Y | Z |
|---|---|---|---|---|---|---|---|---|
| 0 | 0 | 0 | 0 | 0 |   | 0 | 0 | 0 |
| 0 | 0 | 0 | 0 | 1 |   | – | – | – |
| 0 | 0 | 0 | 1 | 0 |   | 0 | 1 | 1 |
| 0 | 0 | 0 | 1 | 1 |   | 0 | 0 | 0 |
| 0 | 0 | 1 | 0 | 0 |   | 0 | 1 | 1 |
| 0 | 0 | 1 | 0 | 1 |   | 0 | 0 | 0 |
| 0 | 0 | 1 | 1 | 0 |   | – | – | – |
| 0 | 0 | 1 | 1 | 1 |   | 0 | 1 | 1 |
| 0 | 1 | 0 | 0 | 0 |   | – | – | – |
| 0 | 1 | 0 | 0 | 1 |   | 0 | 0 | 0 |
| 0 | 1 | 0 | 1 | 0 |   | – | – | – |
| 0 | 1 | 0 | 1 | 1 |   | 0 | 1 | 1 |
| 0 | 1 | 1 | 0 | 0 |   | – | – | – |
| 0 | 1 | 1 | 0 | 1 |   | 0 | 1 | 1 |
| 0 | 1 | 1 | 1 | 0 |   | – | – | – |
| 0 | 1 | 1 | 1 | 1 |   | – | – | – |
| 1 | 0 | 0 | 0 | 0 |   | – | – | – |
| 1 | 0 | 0 | 0 | 1 |   | – | – | – |
| 1 | 0 | 0 | 1 | 0 |   | 0 | 1 | 1 |
| 1 | 0 | 0 | 1 | 1 |   | – | – | – |
| 1 | 0 | 1 | 0 | 0 |   | 1 | 0 | 1 |
| 1 | 0 | 1 | 0 | 1 |   | – | – | – |
| 1 | 0 | 1 | 1 | 0 |   | 1 | 1 | 2 |
| 1 | 0 | 1 | 1 | 1 |   | 1 | 0 | 1 |
| 1 | 1 | 0 | 0 | 0 |   | – | – | – |
| 1 | 1 | 0 | 0 | 1 |   | – | – | – |
| 1 | 1 | 0 | 1 | 0 |   | – | – | – |
| 1 | 1 | 0 | 1 | 1 |   | 0 | 1 | 1 |
| 1 | 1 | 1 | 0 | 0 |   | – | – | – |
| 1 | 1 | 1 | 0 | 1 |   | 1 | 0 | 1 |
| 1 | 1 | 1 | 1 | 0 |   | – | – | – |
| 1 | 1 | 1 | 1 | 1 |   | 1 | 1 | 2 |

The truth table is reduced using Boolean reduction algorithms and logic facts about the operands and implemented as the conditional carry logic for hCin2(16). The final equation for the X86 example shown above is $$Y = D(\overline{AC} + \overline{E} + B) + \overline{AC}(\overline{E} + B) + AC$$

hCin2(16) EQUATION REDUCTION NOTES/LOGICAL FACTS:

If ea_cout15=1, then at least one of CinA(16), CinB(16), or Cin2(16) must be 1.

If CinB(16)=Cin2(16)=1 and ea_cout15=0, then wl_limit_carry=1.

If CinA(16)=1, then ea_cout15=1.

If CinA(16)=CinB(16)=Cin2(16)=1, then wl_limit_carry=ea_cout15=1.

If wl_limit_carry=1, then at least one of CinB(16) or Cin2(16) must be 1.

If wl_limit_carry=ea_cout15=1, then at least two of CinA(16), CinB(16) and Cin2(16) must be 1.

If ea_cout15=0, then CinA(16)=0.

MORE LOGICAL FACTS USED TO CREATE TRUTH TABLE:

If wl_limit carry=1 and CinB(16)=0, then hCin2(16)=1.
We have only one real carry and we did not push a carry to stage 2, so we must carry at stage 3.

If CinA(16)=Cin2(16)=1, then hCin2(16)=1.
The carry at stage 1 is from EA generation so any carry at stage 3 is real.

If ea_cout15=0 and Cin2(16)=1, the hCin2(16)=1.

If we do not need to kill a carry, any carry at stage 3 is real.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for performing an address limit check comprising:

a first adder receiving a displacement, an index and a base address for calculating an effective address;

a second adder receiving sum and carry outputs of said first adder for calculating an effective address and carry out;

means for inputting an address limit value;

means for storing an addressability mode field;

a third adder for calculating first partial limit information based on said first adder results and said limit value;

a fourth adder for calculating second partial limit information based on said first adder results and the limit value and conditioned carry out values of said third adder;

means for conditioning carry out values of said third adder and said second adder to control the operation of said fourth adder based on said addressability mode field; and means responsive to said carry out of the fourth adder and said carry out of the second adder to assert a limit check condition.

2. The apparatus of claim 1, wherein said limit information comprises an operand word-length.

3. The apparatus of claim 1, wherein said third adder comprises a 16-bit adder.

4. The apparatus of claim 1, wherein said first adder comprises a carry save adder producing a partial sum and carry for each bit position.

5. The apparatus of claim 4, wherein said second adder comprises a carry select adder.

6. The apparatus of claim 4, wherein said conditioning means is responsive to said partial sum and carry information from said first adder.

7. The apparatus of claim 1, wherein said third and fourth adders comprise carry save adders producing a partial sum and carry for each bit position.

8. The apparatus of claim 7, wherein said third and fourth adders further comprise carry select adders responsive to said partial sum and carry for each bit position from said carry save adders producing a sum and carry indication.

9. An apparatus for performing an address limit check in a microprocessor supporting different modes of operation comprising:

a first carry save adder receiving a displacement, an index and a base address for calculating an effective address;

a second carry select adder receiving sum and carry outputs of said first carry save adder for calculating an effective address and carry out;

means for inputting an address limit value;

means for storing an addressability mode field;

a third adder for calculating first partial limit information based on said first adder results and said limit value, said third adder comprising a carry save adder and a carry select adder;

a fourth adder for calculating second partial limit information based on said first adder results and the limit value and conditioned carry out values of said third adder, said fourth adder comprising a carry save adder and a carry select adder;

conditional carry logic for conditioning carry out values of said third adder and said second adder to control the operation of said fourth adder based on said addressability mode field; and limit logic responsive to said carry out of the fourth adder and said carry out of the second adder to assert a limit check condition.

10. The apparatus of claim 9 wherein said addressability mode is a 16-bit mode or a 32-bit mode.